United States Patent [19]
Hsieh

[11] 3,815,972
[45] June 11, 1974

[54] LOW VOLTAGE LIQUID CRYSTAL DISPLAY

[75] Inventor: Paul Y. Hsieh, Ridgewood, N.J.

[73] Assignee: Ing. C. Olivetti & C., S.p.A., Ivrea, Italy

[22] Filed: Aug. 9, 1972

[21] Appl. No.: 279,130

[52] U.S. Cl....... 350/160 LC, 23/230 LC, 252/408, 350/150
[51] Int. Cl............................ G02f 1/28, G02n 31/00
[58] Field of Search...... 252/408; 350/160 LC, 150; 23/230 LC

[56] References Cited
UNITED STATES PATENTS
3,689,525  9/1972  Scheurle et al. ................ 260/473 R
3,690,745  9/1972  Jones .............................. 350/160 R FOREIGN PATENTS OR APPLICATIONS
1,170,486  11/1969  Great Britain.................... 252/408

OTHER PUBLICATIONS

Usol'Tseva et al., Chemical Characteristics, Structure AND and of Liquid Crystal, Russian Chem., Rev., Vol. 32, No. 9, pp. 495–507, (September 1963).

Primary Examiner—William J. Van Balen

[57] ABSTRACT

An improved orientation type liquid crystal display having a layer of a mixture of liquid crystal materials confined between a pair of substrates and electrodes for applying an electric field across the substrate. The mixture of liquid crystal materials includes between 5 and 60 percent by weight of an orientation-type liquid crystal material and between 95 and 45 percent by weight of a dynamic scattering type liquid crystal material.

1 Claim, No Drawings

LOW VOLTAGE LIQUID CRYSTAL DISPLAY

BACKGROUND OF THE INVENTION

This invention relates generally to improved low voltage liquid crystal materials and more particularly to improved low voltage liquid crystal materials which are usable at room temperature and below.

Because of their unique properties, liquid crystal displays are becoming widely used in many applications such as calculators and watches. Most liquid crystal materials used in displays to date operate in the dynamic scattering mode. These materials are normally transparent to incident light but become turbulent under the influence of an applied electric field and scatter incident light.

Normally, dynamic scattering type displays operate with AC voltages on the order of 10 to 30 volts. DC Excitation voltages of the same order of the magnitude may also be used but greatly reduce the life of the liquid crystal material.

Recently nematic liquid crystal materials which operate on much lower voltage levels, for instance on the order of 6 to 8 volts for ¼ to 1 mil cells, have been introduced, such as those described in the article entitled "Voltage Dependent Optical Activity of a Twisted Nematic Liquid Crystal" which appears in the Feb. 15, 1971 issue of Applied Physics Letters. In displays using these low voltage materials the interior faces of the substrates between which the liquid crystal material confined are treated by rubbing or in some other manner to cause the molecules of the liquid crystal material in the vicinity of the substrate to align themselves parallel to each other and to the plane of the substrate. The substrates are arranged so that the molecules of a liquid crystal material adjacent to one of the substrates are aligned peripendicular to the molecules of the material adjacent to the other substrate. The intermediate molecules of the layer of liquid crystal material then tend to align themselves in a corkscrew fashion between the substrates so that they twist the axis of polarization of light passing through the layer of material by 90°.

Under the influence of an electric field perpendicular to the layer, however, the molecules of the liquid crystal material tend to align themselves parallel to the field so that light passing through portions of the display excited by an electric field is not twisted but passes through unaltered. Thus it is possible with the use of polarized layers to produce either white-on-black or black-on-white displays.

These orientation-type liquid crystal displays have significant advantages over the dynamic scattering type displays. As stated above, the voltage levels required for exitation of the display, on the order of 6 to 8 volts, are much lower than those required for the displays operating in the dynamic scattering mode, thus making the displays directly compatible with MOS circuitry. Furthermore, the contrast of these displays is significantly improved over that achievable with the dynamic scattering type displays and their power consumption is lower.

Known orientation-type liquid crystal materials have only very limited usefulness, however, since they have relatively high mesophase temperature and do not operate at room temperature. British Pat. No. 1,228,606 describes a number of orientation-type crystal materials and states that the crystal nematic-transition temperature may be lowered by mixing two or more orientation-type materials together. By so doing they achieve a mixture of orientation-type liquid crystal materials having a crystal-nematic transition temperature of as low as 41°C, a temperature still much too high for practical application.

In the above mentioned article appearing in the Applied Physics Letters a mixture of orientation-type of liquid crystal materials is described which is nematic between 20° and 94°C. While this temperature range is an improvement over that of the material disclosed in the above cited British patent, it is still too high to be practical for most applications.

SUMMARY OF THE INVENTION

In order to overcome these problems which make the previously known orientation-type liquid crystal materials impractical for most uses, applicant provides an orientation-type liquid crystal material which is comprised of a mixture of an orientation-type liquid crystal material with a dynamic scattering type liquid crystal material. The resulting liquid crystal material is of the orientation-type but has a crystal-nematic transition temperature on the order of or below that of the component dynamic scattering type liquid crystal material.

DETAILED DESCRIPTION

Most nematic liquid crystal materials have a general structure

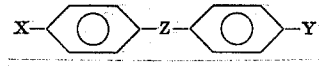

Where X and Y are a group selected from CN, R, RO, ROCOO and ROCO (R is an alkyl group of one to eight carbon atoms), and Z may be selected from CH=N, N=N,

and CH=CH. The molecules of liquid crystal materials which operate in the dynamic scattering mode (e.g., where X=RO and Y=R) have a negative dielectric anisotropy, i.e., the dielectric constant ($\epsilon_\perp$) perpendicular to the axis of the molecule is larger than that parallel to the molecular axis $\epsilon_\parallel$). Because the molecules are long and thin, the magnitude of the dielectric anisotropy of dynamic scattering type materials is quite small, generally on the order of ($\epsilon_\parallel - \epsilon_\perp = -0.1$ to $-0.2$ and almost never larger than $-3$ in magnitude.

Molecules of liquid crystals which operate in the orientation mode (i.e., X = RO or R, and Y = C≡N) have a positive dielectric anisotropy i.e., the dielectric constant parallel to axis of the molicules ($\epsilon_\parallel$) is larger than that perpendicular to the molecular axis ($\epsilon_\perp$). The magnitude of the dielectric anisotropy for orientation-type liquid crystals is relatively large, on the order of $\epsilon_\parallel - \epsilon_\perp = 10 - 30$.

Materials with higher molecular dielectric anisotropy generally have higher thermal stability and therefore higher crystal-nematic transition temperatures. This is apparent by comparing 4-ethoxy benzylidene 4'-n-butylaniline (EBBA), a dynamic scattering type liquid crystal material having negative dielectric anisotropy of $\epsilon_\parallel - \epsilon_\perp = -0.1$ and a nematic range of 35° to 80°C, with 4-ethoxybenzylidene — 4'-amino-benzonitrile (PEBAB), an orientation-type liquid crystal material having a positive molecular dielectric anisotropy of $\epsilon_{\parallel} - \epsilon_{\perp} = 17-21$ depending upon frequency and temperature used in the measurements and a nematic range of 105° to 130°C.

Applicant has found according to his invention that by mixing an orientation-type liquid crystal material having a high positive molecular dielectric anisotropy with a dynamic scattering type liquid crystal material having a relatively low negative dielectric anisotropy, a liquid crystal material results having a crystal-nematic transition temperature which is generally lower than that of the dynamic scattering type material for the preferred composition ratio but which operates as an orientation-type material.

Since the magnitude of the net positive molecular dielectric anisotropy, $\epsilon_{\parallel} - \epsilon_{\perp}$, of the orientation-type material is much larger than the net negative one of the dynamic scattering type material, the mixture can consist of as much as 90 to 95 percent by weight of the lower temperature dynamic scattering type liquid crystal material with only 5 to 10 percent by weight of the orientation-type liquid crystal material and still retain the characteristics of the positive material.

The range of relative concentrations over which a mixture of orientation and dynamic scattering type liquid crystal materials operates in the orientation mode varies somewhat with the materials used, but is generally on the order of between 5 and 60 percent by weight of orientation-type material. The preferred range, however, is between about 10 to 30 percent. With high concentrations of orientation-type material there is a high nematic to liquid transition temperature and a higher viscosity. The nematic range and preferred concentration for a mixture of particular orientation and dynamic scattering type liquid crystal materials may be easily determined by a simple experimentation.

Typical orientation-type liquid crystal materials are the following:

| Composition | Crystal to Nematic Transition Temperature | Nematic to Isotropic Liquid Transition Temperature |
| --- | --- | --- |
| p-(p-ethoxy benzylidene) aminobenzonitrile | 105°C | 130°C |
| p-(p-n-butoxy benzylidene) aminobenzonitrile | 63°C | 106°C |
| p-(p-n-hexyl benzylidene) aminobenzonitrile | 54.5°C | 101°C |
| p-(p-octanoyloxy benzylidene) aminobenzonitrile | 54°C | 97.6°C |

Other examples of orientation-type liquid crystal materials are given in the above mentioned British Patent and article appearing in the Applied Physics Letters. As is apparent from the article and the British patent, the orientation-type liquid crystal material component of the mixture according to the invention may be either a single compound or a mixture of two or more of these compounds.

Examples of dynamic scattering type liquid crystal materials which may be used as a component in the mixture according to the invention are the following:

| Composition | Crystal to Nematic Transition Temperature | Nematic to Isotropic Liquid Transition Temperature |
| --- | --- | --- |
| 4-methoxy, 4'n-butyl benzylidene aniline | 19°C | 45°C |
| 4-ethoxy, 4'n-butyl benzylidene aniline | 35°C | 80°C |
| N-(O-hydroxy, p-methoxy benzylidene)-p-butyl aniline | 44.5°C | 64.5°C |
| N-(O-hydroxy, p-n-butyloxy benzylidene)-p-butyl aniline | 37°C | 85.5°C |
| 4-butyl, 4'-methoxy azoxybenzene | 16°C | 76°C |
| A mixture of 4-butyl, 4'-methoxy azoxybenzene 4-butyl, 4'-ethoxy azoxybenzene | −5°C | 75°C |

The above named liquid crystal materials are known in the literature and may be easily obtained or produced. The method of preparation of liquid crystal display devices is also well known in the art. Display devices which use the compositions prepared in accordance with the present invention in the orientation mode with low driving voltages, for example, an order of 6–8 volts for ¼ to 1 mil cells. These displays are operable at room temperatures and even below.

The following examples, all of which respond to electric fields in the orientation mode in their nematic range, are given to illustrate specific embodiments of the present invention.

EXAMPLE 1

A low voltage liquid crystal display was fabricated using ¼ to 1 mil thick layer of an orientation-type liquid crystal material mixture having the following composition:

| Components | Parts by Weight |
| --- | --- |
| p-(p-ethoxy benzylidene) aminobenzonitrile | 1 |
| p-(p-n-butoxy benzylidene aminobenzonitrile | 1 |
| 4-methoxy, 4'n-butyl benzylidene aniline | 3.5 |
| 4-ethoxy, 4'n-butyl benzylidene aniline | 3.5 |

The mixture has nematic to liquid transition temperature of 59°C and is a fluid nematic at room temperature and gells upon cooling below 0°C. The mixture continues to respond to electric fields even in the gelled state although at a slower speed due to the increase in viscosity. This device operates with polarizing layers in the manner described above and requires switching voltage of between 6 and 8 volts.

EXAMPLE 2

A low voltage liquid crystal display similar to that described in Example 1 was prepared using a mixture having the following composition:

| Components | Parts by Weight |
| --- | --- |
| p-(p-n-butoxy benzylidene) aminobenzonitrile | 1 |
| p-(p-n-hexyl benzylidene) aminobenzonitrile | 1 |
| p-(p-octanoyloxy benzylidene) aminobenzonitrile | 1 |
| 4-methoxy, 4'n-butyl benzylidene aniline | 1.5 |
| 4-ethoxy, 4'n-butyl benzylidene aniline | 1.5 |

The mixture has a nematic range of between 16° and 83°C and responds well to electric fields in the orientation mode in this temperature range.

EXAMPLE 3

A low voltage liquid crystal display similar to that described in Example 1 was prepared using a mixture having the following composition:

| Components | Parts by Weight |
| --- | --- |
| p-(p-ethoxy benzylidene) aminobenzonitrile | 1 |
| p-(p-n-butoxy benzylidene) aminobenzonitrile | 1 |
| n-(O-hydroxy, p-methoxy benzylidene)-p-butyl aniline | 4.16 |
| n-(O-hydroxy, p-n-butyloxy benzylidene)-p-butyl aniline | 3.84 |

The mixture is a free flowing fluid nematic at room temperature. It has a nematic liquid transition temperature of 72°C and gelled instead of crystallized upon cooling to 0°C. It responds to electric fields even at a gelled stage although at a slower speed due to the increase in viscosity.

EXAMPLE 4

A low voltage liquid crystal display similar to that described in Example 1 was prepared using a mixture having the following composition:

| Components | Parts by Weight |
| --- | --- |
| p-(p-n-hexyl benzylidene) aminobenzonitrile | 1 |
| 4-butyl, 4'-methoxy azoxybenzene | 1 |

The mixture has a nematic range of between 5°C and 85°C.

EXAMPLE 5

A low voltage liquid crystal display similar to that described in Example 1 was prepared using a mixture having the following composition:

| Components | Parts by Weight |
| --- | --- |
| p-(p-n-butoxy benzylidene) aminobenzonitrile | 1 |
| A mixture of 4-butyl, 4'-methoxy azoxybenzene and 4-butyl, 4'-ethoxy azoxybenzene | 1 |

The mixture is nematic between 14°C and 94°C.

EXAMPLE 6

A low voltage liquid crystal display similar to that described in Example 1 was prepared using a mixture having the following composition:

| Components | Parts by Weight |
| --- | --- |
| p-(p-n-hexyl benzylidene) aminobenzonitrile | 1 |
| A mixture of 4-butyl, 4'-methoxy azoxybenzene and 4-butyl, 4'-ethoxy azoxybenzene | 1 |

The mixture is nematic between 0°C and 90°C.

EXAMPLE 7

A low voltage liquid crystal display similar to that described in Example 1 was prepared using a mixture having the following composition:

| Components | Parts by Weight |
| --- | --- |
| p-(p-n-butoxy benzylidene) aminobenzonitrile | 1 |
| p-(p-n-hexyl benzylidene) aminobenzonitrile | 1 |
| A mixture of 4-butyl, 4'-methoxy azoxybenzene and 4-butyl, 4'-ethoxy azoxybenzene | 1 |

The mixture is nematic between 23°C and 96°C.

EXAMPLE 8

A low voltage liquid crystal display similar to that described in Example 1 was prepared using a mixture having the following composition:

| Components | Parts by Weight |
| --- | --- |
| p-(p-n-butoxy benzylidene) aminobenzonitrile | 1 |
| p-(p-n-hexyl benzylidene) aminobenzonitrile | 1 |
| A mixture of 4-butyl, 4'-methoxy azoxybenzene and 4-butyl, 4'-ethoxy azoxybenzene | 2 |

The mixture has a nematic to liquid transition temperature of 94°C and gels rather than crystallizing upon cooling to 0°C.

EXAMPLE 9

A low voltage liquid crystal display similar to that described in Example 1 was prepared using a mixture having the following composition:

| Components | Parts by Weight |
| --- | --- |
| p-(p-n-butoxy benzylidene) aminobenzonitrile | 3 |
| p-(p-n-hexyl benzylidene) aminobenzonitrile | 3 |
| A mixture of 4-butyl, 4'-methoxy azoxybenzene and 4-butyl, 4'-ethoxy azoxybenzene | 14 |

The mixture has a nematic to liquid transition temperature of 86°C and gels rather than crystallizing upon cooling to 0°C.

EXAMPLE 10

A low voltage liquid crystal display similar to that described in Example 1 was prepared using a mixture having the following composition:

| Components | Parts by Weight |
|---|---|
| p-(p-n-butoxy benzylidene) aminobenzonitrile | 1 |
| p-(p-n-hexyl benzylidene) aminobenzonitrile | 1 |
| p-(p-octanoyloxy benzylidene) aminobenzonitrile | 1 |
| A mixture of 4-butyl, 4'-methoxy azoxybenzene and 4-butyl, 4'-ethoxy azoxybenzene | 30 |

The mixture has a nematic to liquid transition temperature of 97°C and gells upon cooling to −60°C. It does not have nematic to crystal transition temperature.

EXAMPLE 11

A low voltage liquid crystal display similar to that described in Example 1 was prepared using a mixture having the following composition:

| Components | Parts by Weight |
|---|---|
| p-(p-n-butoxy benzylidene) aminobenzonitrile | 1 |
| p-(p-n-hexyl benzylidene) aminobenzonitrile | 1 |
| p-(p-octanoyloxy benzylidene) aminobenzonitrile | 1 |
| A mixture of 4-butyl, 4'-methoxy azoxybenzene and 4-butyl, 4'-ethoxy azoxybenzene | 3 |

The mixture has a neumatic range from −18° to 93° C.

EXAMPLE 12

A low voltage liquid crystal display similar to that described in Example 1 was prepared using a mixture having the following composition:

| Components | Parts by Weight |
|---|---|
| p-(p-ethoxy benzylidene) aminobenzonitrile | 1 |
| p-(p-n-butoxy benzylidene) aminobenzonitrile | 1 |
| p-(p-n-hexyl benzylidene) aminobenzonitrile | 1 |
| p-(p-octanoyloxy benzylidene) aminobenzonitrile | 1 |
| A mixture of 4-butyl, 4'-methoxy and azoxybenzene and 4-butyl, 4'-ethoxy azoxybenzene | 40 |

The mixture has a nematic to liquid transition temperature of 72°C and gells upon cooling to −60°C but apparently has no nematic to crystal transition temperature.

EXAMPLE 13

A low voltage liquid crystal display similar to that described in Example 1 was prepared using a mixture having the following composition:

| Components | Parts by Weight |
|---|---|
| p-(p-ethoxy benzylidene) aminobenzonitrile | 3 |
| p-(p-n-butoxy benzylidene) aminobenzonitrile | 3 |
| A mixture of 4-butyl, 4'-methoxy azoxybenzene and 4-butyl, 4'-ethoxy azoxybenzene | 20 |

The mixture has a nematic to liquid transition temperature of 90°C and upon cooling to 0°C, gells instead of crystallizing. The mixture continues to respond to electric fields in the gelled stay even at −20°C, although at a slower speed due to the increase in viscosity.

The dynamic scattering type liquid crystal material given as a mixture of 4-butyl, 4'-methoxy azoxybenzene and 4-butyl, 4'-ethoxy azoxybenzene is comercially available from E. M. Laboratories, Elms Ford, N.Y. under the trade name MERCK PHASE V.

The above listed examples on liquid crystal materials are not meant to be exclusive. They are merely the ones which the applicant has actually tried. More significantly, however, applicant has found that every mixture of liquid crystal material made in accordance with the principles of the invention has operated in the orientation mode and he has not found any nematic liquid crystal materials which do not work when mixed with other materials in accordance with the invention.

What is claimed is:

1. An orientation-type crystal display having a layer of a mixture of liquid crystal materials confined between a pair of substrates and means for applying an electric field across said layer, said mixture of liquid crystal materials comprising:

between 5 and 60 percent by weight of orientation-type liquid crystal material consisting essentially of a mixture of substantially equal parts of at least three compounds chosen from the group consisting of:

p-(p-n-butoxy benzylidene) aminobenzonitrile,
p-(p-n-hexyl benzylidene) aminobenzonitrile,
p-(p-n-ethoxy benzylidene) aminobenzonitrile, and p-(p-octanoyloxy benzylidene) aminobenzonitrile, and between 95 and 40 percent by weight of a dynamic scattering type liquid crystal material consisting essentially of a mixture of substantially equal parts of 4-butyl, 4'-methoxy azoxybenzene and 4-butyl, 4'-ethoxy azoxybenzene.

* * * * *